US012280989B2

(12) United States Patent
Kopp

(10) Patent No.: US 12,280,989 B2
(45) Date of Patent: Apr. 22, 2025

(54) DRYWALL LIFTING APPARATUS

(71) Applicant: Professional Framing Systems LLC, Fremont, NH (US)

(72) Inventor: Stephen M. Kopp, Fremont, NH (US)

( * ) Notice: Subject to any disclaimer, the term of this patent is extended or adjusted under 35 U.S.C. 154(b) by 0 days.

(21) Appl. No.: 18/211,052

(22) Filed: Jun. 16, 2023

(65) Prior Publication Data

US 2024/0076168 A1 Mar. 7, 2024

Related U.S. Application Data

(60) Provisional application No. 63/352,937, filed on Jun. 16, 2022.

(51) Int. Cl.
*B66C 23/48* (2006.01)

(52) U.S. Cl.
CPC .................................... *B66C 23/48* (2013.01)

(58) Field of Classification Search
CPC .... B66F 9/06; B66F 9/08; B66F 9/087; B66C 23/48; B66C 23/36; E04F 21/1811
USPC ................................ 414/10, 11, 12; 212/901
See application file for complete search history.

(56) References Cited

U.S. PATENT DOCUMENTS 2,531,346 A * 11/1950 Oakey ..................... B66B 9/187 187/242
2,652,164 A * 9/1953 Tipps ........................ B66F 9/06 414/634
2,967,627 A * 1/1961 Vinson ...................... B62B 3/02 254/2 R
3,385,401 A * 5/1968 Campbell ................. B66F 9/06 187/244
3,977,534 A * 8/1976 Blake .................. E04F 21/1894 156/60
4,071,115 A * 1/1978 Garcia ...................... B66B 9/16 187/401
4,285,626 A * 8/1981 Donato ................. B66F 9/0755 414/622
4,782,962 A * 11/1988 Hackworth ............. B66C 23/48 212/255
4,999,902 A * 3/1991 Schumacher ............. B66F 9/06 187/238
5,090,667 A * 2/1992 Harrell ...................... B66F 9/06 254/326
5,269,501 A * 12/1993 Liegel ....................... B66F 9/06 212/292
5,433,292 A * 7/1995 Haymore ............ B66F 9/07518 187/235
6,000,898 A * 12/1999 Sharp .................... E04G 21/168 414/800
6,371,449 B1 * 4/2002 Chamberlain ............ B66F 7/02 254/323
6,739,819 B2 * 5/2004 Caudill ............... E04F 21/1811 414/11

(Continued)

*Primary Examiner* — Gregory W Adams
(74) *Attorney, Agent, or Firm* — Milstein Zhang & Wu LLC; Duan Wu, Esq.

(57) ABSTRACT

The invention is an apparatus that can handle a bulky and/or heavy object such as construction materials including lifting, transporting, and setting down the object. The apparatus includes a weighed base platform with a mast erected at the front. A cable-based hoisting mechanism is built over the platform such that the cable travels over the top of the mast to the front for securing and hoisting the object. The apparatus includes further stability features.

15 Claims, 9 Drawing Sheets

(56) References Cited

U.S. PATENT DOCUMENTS

| | | | | |
|---|---|---|---|---|
| 7,021,606 | B2 * | 4/2006 | Raycraft | E04G 21/167<br>52/127.2 |
| 7,448,598 | B1 * | 11/2008 | Elmlinger | B66F 9/02<br>254/338 |
| 9,668,429 | B2 * | 6/2017 | Dixon | A01G 23/006 |
| 9,725,915 | B1 * | 8/2017 | Hiatt | E04B 1/2612 |
| 10,676,944 | B2 * | 6/2020 | Nguyen | E04F 21/1822 |
| 10,883,281 | B2 * | 1/2021 | Carlei | B62B 3/04 |
| 10,981,761 | B2 * | 4/2021 | Manzi | B66F 9/186 |
| 2012/0098285 | A1 | 4/2012 | Wall | |
| 2013/0292528 | A1 | 11/2013 | Davila | |
| 2019/0345726 | A1 | 11/2019 | Potthoff et al. | |

* cited by examiner

DRYWALL LIFTING APPARATUS

CROSS-REFERENCE TO RELATED APPLICATIONS

This application claims priority to and the benefit of U.S. provisional patent application Ser. No. 63/352,937, filed Jun. 16, 2022, which application is incorporated herein by reference in its entirety.

FIELD OF THE INVENTION

The invention relates to framing and construction apparatuses and methods that can be used to lift, transport and handle large and/or heavy objects such as prefabricated walls, large beams, and other building materials.

BACKGROUND OF THE INVENTION

In building and construction, many objects are large in one, two or three dimensions, for example, steel beams and drywalls. These bulky building materials are often heavy, which make them more difficult to lift, move, or transport. Existing ways of lifting these bulky or large objects call for the operation of a forklift, a crane, or other heavy machineries. These kinds of heavy machineries are expensive to own or rent, require special trainings to operate, and have other shortcomings. For example, these machineries occupy large footprints and require large areas of clearing for them to move around and work. They fare poorly on uneven terrains, and therefore, are always a concern for construction sites that contain vertical elevations, drops, or unpaved grounds. Cranes, in particular, are susceptible to toppling over under high wind conditions, and therefore are limited in their productivity as well as posing personal injury risks to workers at site.

There is a need for a nimbler and safer apparatus that can lift and transport bulky, large and heavy articles, especially ones commonly found at construction sites. Ideally, such an apparatus would be also easy to operate and maintain as well.

SUMMARY OF THE INVENTION

The present invention provides an apparatus for lifting and moving large articles including heavy and/or bulky construction parts and articles such that the afore-mentioned disadvantages of known machineries are overcome or greatly reduced. The apparatus as provided herein through the present invention is compact, easy to operate, and takes relatively little space. It traverses terrains or grounds of various conditions much more easily than a forklift or crane. It is cheap to make, easy to store and requires little maintenance. Moreover, the apparatus of the invention is versatile in tight space, productive under all weather conditions and safe to operate.

In one aspect, the invention relates to an apparatus for handling, lifting and transporting a cargo especially a bulky cargo. The apparatus includes but are not limited to parts as follows:

(a) a base platform having or defining a front side and a rear side that are connected by two lateral sides, said base platform fitted with a pair of front wheels proximate to the base platform's front side and a pair of rear wheels proximate to the base platform's rear side; and (b) a vertical mast having or defining a top and a bottom and erected on said base platform, e.g., proximate to said front side, and a cable actuation means disposed above said base platform for winding and unwinding a cable, where the cable traverses over said top or proximate to said top of the mast such that a distal end of said cable is available over the front of the base platform for fastening a cargo thereto through a fastening means.

In one feature, the apparatus of the invention further includes one or more structural stabilizers for preventing the vertical mast from movement relative to the base platform. In an embodiment, each of said stabilizers includes a bar with one end affixed to said vertical mast (may be the top or waist) and the other end affixed to said base platform such that said stabilizer, said vertical mast and said base platform form a triangle. In one feature, at least two of said stabilizers are connected to said mast, respectively, in two planes that are substantially normal or normal to each other.

In an embodiment, the cable actuation means includes an electric winch with a drum onto which said cable is wound. A raised platform supported by one or more vertical supports may be erected on said base platform; said raised platform, optionally adjustable in height, in turn supports said cable actuation means. The apparatus of the invention may further include a jack for raising and lowering a portion, e.g., the rear side, of said base platform. A battery pack disposed on said base platform may be provided in the apparatus where said batter pack is electrically connected to said cable actuation means and/or the jack.

In another aspect, the invention features front wheels that are larger in diameter than said rear wheels on the base platform such that when both front and rear wheels are resting on the ground, said vertical mast tilts towards the rear at an angle, e.g., between 0 and 45 degrees and preferably between about 5 and about 30 degrees. This provides added support for the cargo during transport. A push bar may be also installed over said base platform for moving the apparatus. In an embodiment, the front wheels are wide tires that are each wider than 7 inches.

In one feature, the front side of the base platform is wider than the rear side. Optionally, one or both of the front and rear sides of the base platform may be adjustable in width, e.g., through telescoping tubes.

In additional features, the vertical mast is further connected to a horizontal member for providing cargo support. The vertical mast may be adjustable in height depending on the size of the cargo, e.g., at least 6, 7, 8, 9, 10, 11, 12, 13, 14, or 15 feet tall when fully extended. In an embodiment, the apparatus of the invention is capable of lifting and transporting at least 2,000, 3,000, or even 4,000 pounds, or more, in cargo weight. In one feature, the base platform is weighed towards its rear portion with solid steel bars and additional weights including heavy battery pack(s) and chargers.

The present invention further provides methods related to the use and other aspects of the lifting apparatus.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
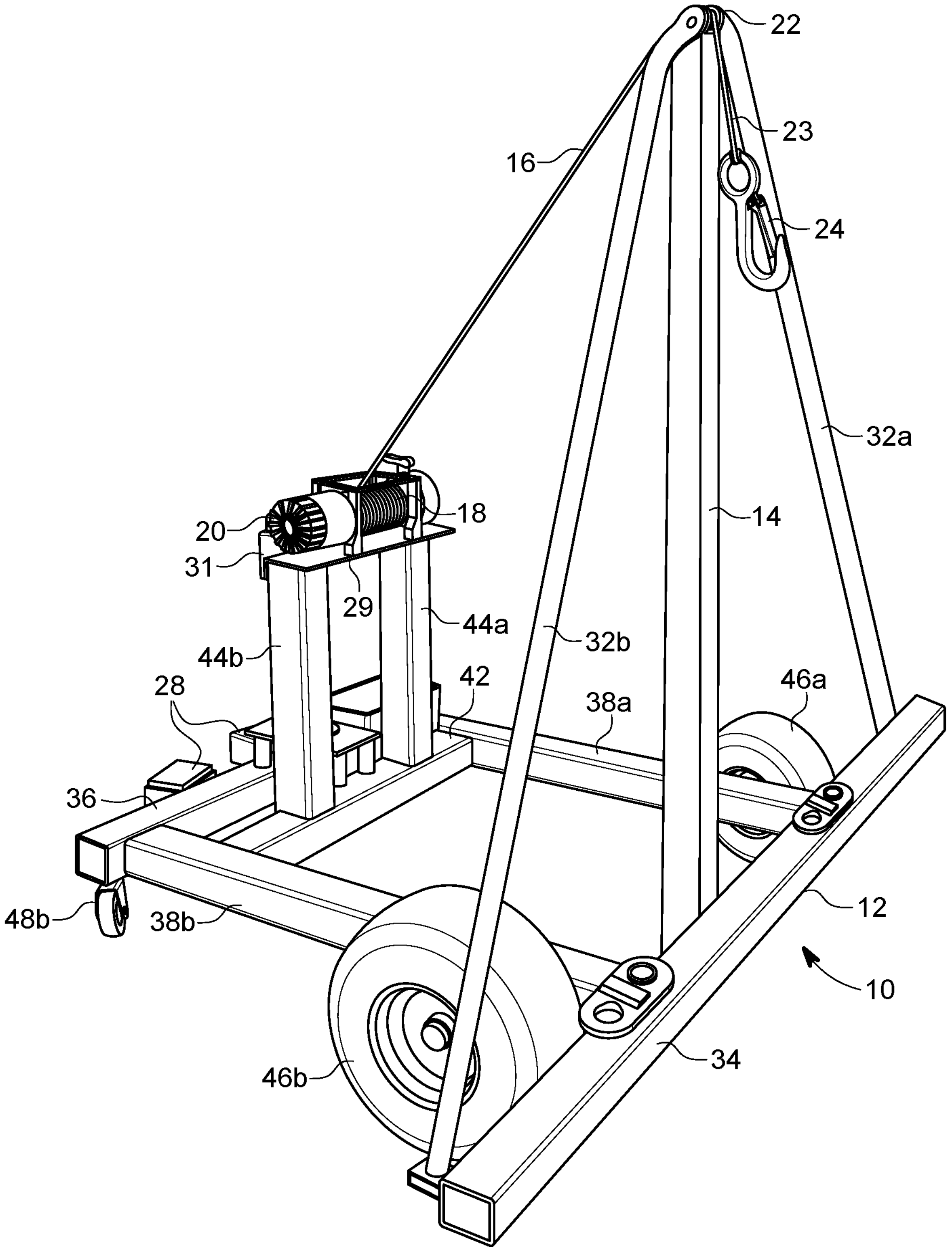
FIG. 1 illustrates a one-quarter perspective view of an exemplary embodiment of a lifting apparatus according to the invention without any cargo.

Unless otherwise noted, technical terms are used according to conventional usage. Throughout the following description and claims, terms such as "vertical", "horizontal", "top", "bottom", "upper", "lower", "front", "back", "rear", "behind" and the like may be used to describe various parts of an apparatus according to the invention. These terms of reference are used for convenience only and are generally consistent with the orientation of the apparatus as it is shown in the drawings, but one should understand that these terms are relative to the way the apparatus is positioned or viewed.

As used in the specification and claims, the singular form "a", "an", or "the" includes plural references unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent," or "except for [a particular feature or element]," or "wherein [a particular feature or element] is not present (included, etc.) . . . ".

When a dimensional measurement is given for a part herein, the value is, unless explicitly stated or clear from the context, meant to describe an average for a necessary portion of the part, i.e., an average for the portion of the part that is needed for the stated purpose. Any accessory or excessive portion is not meant to be included in the calculation of the value.

As used herein, "about" means within plus or minus 10% unless specified otherwise. For example, "about 1" means "0.9 to 1.1", "about 2%" means "1.8% to 2.2%", "about 2% to 3%" means "1.8% to 3.3%", and "about 3% to about 4%" means "2.7% to 4.4%."

As used herein, "bulky" means measuring at least in one direction a length that is no longer easy to handle by hand, e.g., about 4 feet, 5 feet, 6 feet, 7 feet, or longer as measured in at least one direction.

As used herein, "substantially" means within plus or minus 15% unless specified otherwise. For example, "substantially normal" means "at an angle between 67.5 degrees and 103.5 degrees."

The present invention provides an apparatus for handling, i.e., lifting, transporting and positioning, bulky and/or heavy objects especially articles found in construction sites. The apparatus is designed to have a relatively small footprint for easy maneuver around sites of various topographies, and for easy storage. The apparatus is capable of lifting and transporting a load weighing up to 3,000 or 4,000 pounds (about 1,360 or 1,815 kg), e.g., of prefabricated walls that each weighs up to about 1,600 to about 2,000 pounds (about 725 kg to about 900 kg), and/or measuring up to about 15 feet (i.e., about 4.5 meters) in one direction, e.g., a prefabricated wall that is about 14 feet (i.e., about 4.2 meters) tall (see, e.g., FIG. 9A). The apparatus of the invention can be operated by a single person who can then, through the apparatus, lift the article, move it into position and set it in place, whether the article is a sheet of prefabricated wall that is to stand on the ground level or a beam support going into an elevated location. Therefore, the apparatus according to principles of the invention saves on high labor costs and reduces injury risks to workers. The apparatus is also weighed in lower parts, so that its center of gravity is close to the ground to avoid easy toppling—this allows the apparatus to be operable in virtually all weather conditions including those with high wind and therefore greatly increases the productivity. Moreover, the apparatus is fitted with tires so that even if the surface it sits on, e.g., a deck, is breached under the weight of its load, the apparatus is not likely to go through the deck because of weight-spreading through tire surfaces, thereby reducing the amount of damage to the project and the crew.

Referring now to FIGS. 1-6, 9A and 9B, a lifting-and-moving apparatus 10 according to an exemplary embodiment of the invention is shown to include a base platform 12 upon which a vertical mast 14 is erected at the front. A cable 16 is wound upon a drum 18 that is in turn controlled through a cable actuation means, e.g., an electric winch 20, that is disposed behind the mast 14. The free, unwound portion of the cable 16 is threaded or guided through either a cable guide 25 and/or the groove of a cable wheel 22 that are in turn affixed to the top or thereabout of the mast 14 such that a distal end 23 of the cable 16 is available over the front side of the apparatus 10 (opposite its rear side where the operator would be situated) for fastening a cargo 30 thereto through a fastening means. Any fastening means known to one skilled in art for securing and fastening an article can be used for purpose of the invention including one or more clamps, magnets, loops, hooks, straps, nets, harbingers, Velcro® strips and so on. For illustration purpose, the fastening means is depicted in FIG. 1 as a hook 24, and a combination 26 of ring(s), harbinger(s) and heavy-duty (e.g., canvas) straps in FIG. 2.

Figure 2:
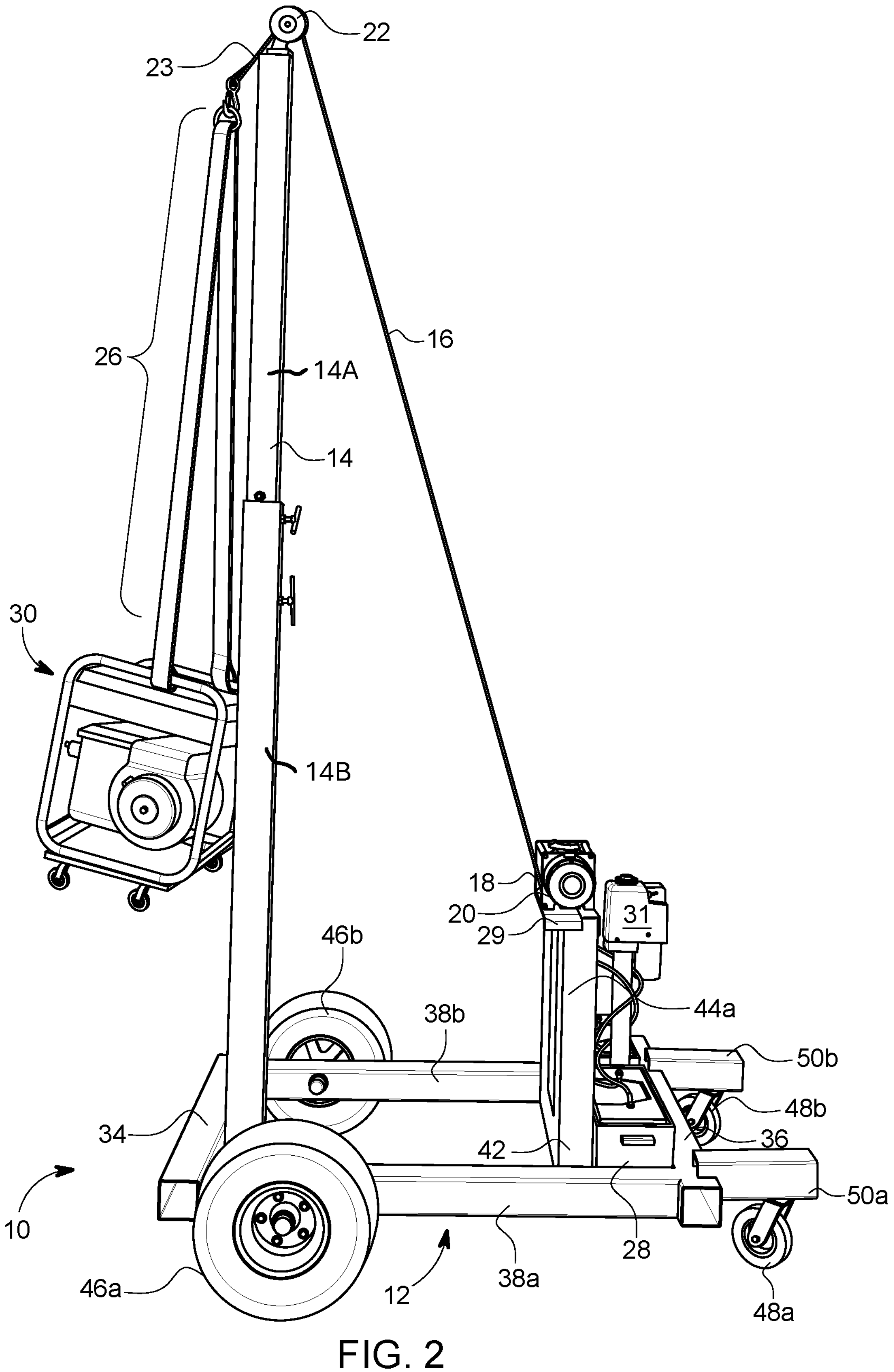
FIG. 2 illustrates a side perspective view of an exemplary embodiment of a lifting apparatus according to the invention loaded with a cargo.

The cable actuation means as exemplified by the winch 20 may be optionally connected to one or more battery packs 28 that can be removably affixed to base platform 12 both for convenience and for adding weight and stability to the base, preferably to the rear portion of the base platform for balancing weight distribution when the apparatus 10 is loaded in the front with heavy objects (see e.g., FIG. 2). Similarly, other weights, e.g., sandbags 65 (FIG. 9A) can also be added to parts of the apparatus 10, especially the rear portion of the base platform 12. To avoid loss of power during operation, the apparatus 10 can optionally be further equipped with a battery charger, e.g., an automatic marine/waterproof charger available from Duracell® or ACT®, to charge the battery packs 28 when any of the batteries runs low. The winch or any electric cable actuation means can be alternatively powered through an electric cable connected to a different power source, e.g., an electric outlet. The cable actuation means as exemplified by the winch 20 is further optionally situated on a raised platform 29.

An electric, manual or hydraulic jack 31 is optionally provided for adjusting the height and orientation of the base platform 12 hence any degree of tilting of the apparatus 10. The jack 31 can be situated anywhere as long as it is mechanically and operatively connected to the base platform 12, and in the embodiment exemplified in FIGS. 1 and 2, in the rear and near the raised platform 29 and the winch 20. When actuated, the jack 31 will raise or lower the height of the base platform around it, i.e., the rear portion in the illustrated embodiment, resulting in a tilt.

Figure 9A:
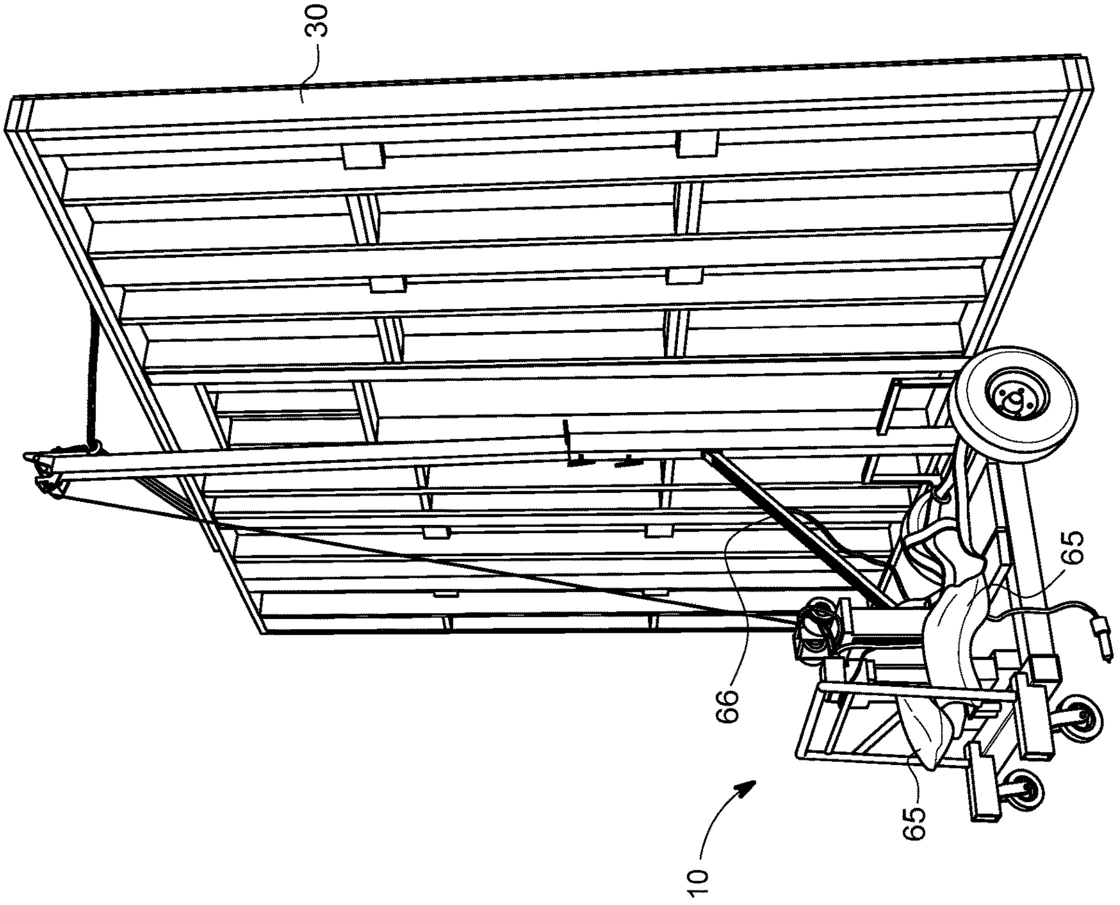
FIG. 9A shows a parked alternate embodiment of a lifting apparatus according to the invention loaded in the front with a prefabricated wall. This alternate embodiment shows different stabilizers for the mast.
Figure 9B:
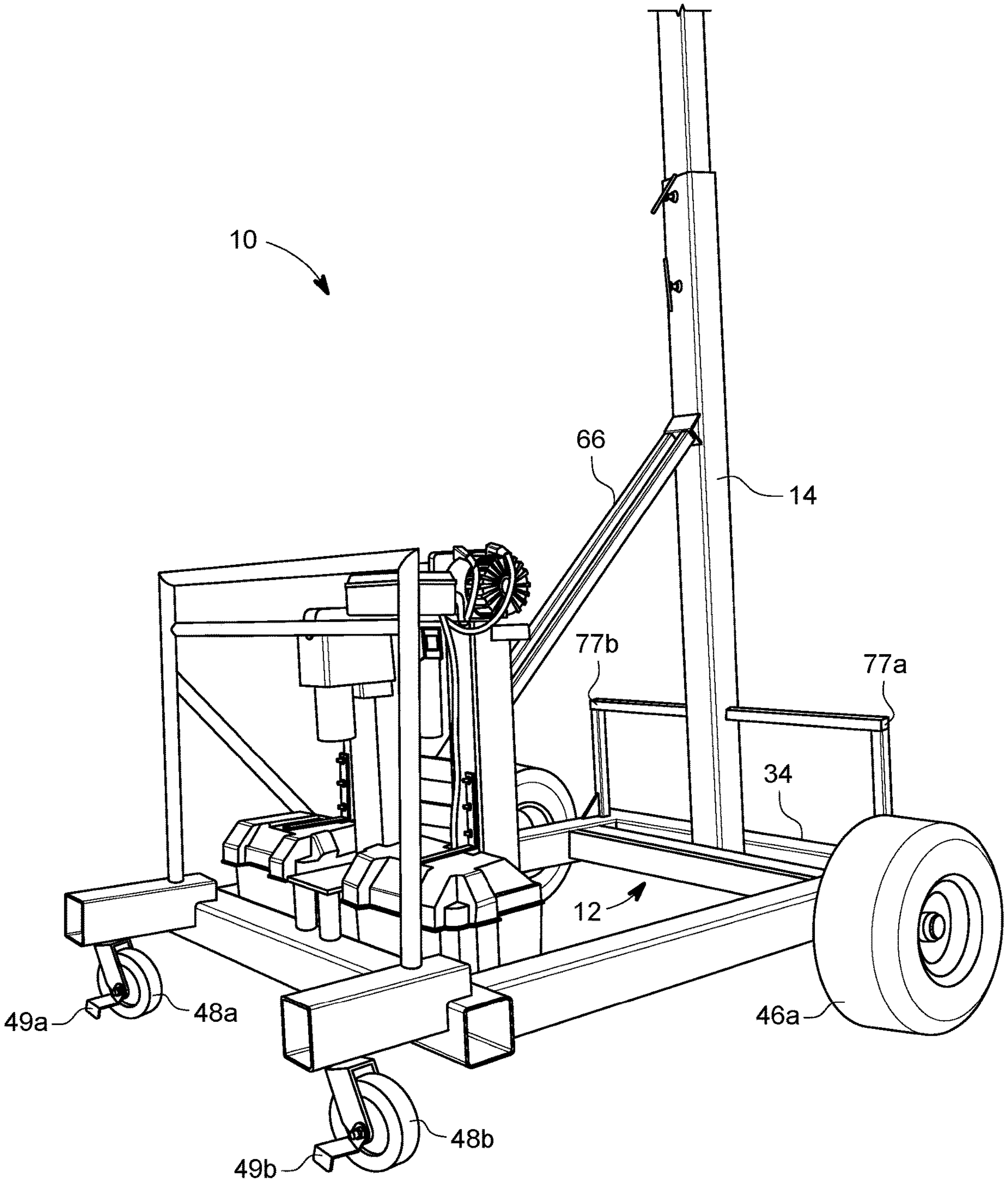
FIG. 9B shows details of the alternate embodiment in FIG. 9A.

In one feature of the invention, the mast 14 is optionally stabilized through structural stabilizers in relation to the rest of the lifting apparatus 10, e.g., the base platform 12. An example of such a stabilizer is illustrated in FIG. 1 as two steel bars 32*a* and 32*b* that are each affixed to the base platform 12 on one end and to a mast top 39 (FIG. 4) on the other. The stabilizing bars 32*a* and 32*b* each form a triangle through itself, the vertical mast 14 and the base platform 12 to limit or minimize any motion of the mast 14 relative to the base platform 12. One or more optional stabilizing elements can be added in a similar fashion to limit mast movements. Another example of such stabilizers can be seen in FIGS. 9A and 9B, where one or two steel bars 66 are affixed to the base platform 12 or the raised platform 29 thereon on one end and to the mast 14 (anywhere on the mast, e.g., around its middle) on the other end, forming a triangle. Besides such a triangle, as shown in FIGS. 9A and 9B, additional stabilizers can be utilized, preferably in a different plane. In the embodiment shown, additional steel-bar stabilizers 77*a* and 77*b* are installed between the mast 14 and a front bar 34 of the platform 12 in a plane that is normal or substantially normal to that formed by the triangle involving bars 66. Stabilizing the mast 14 in two planes normal or substantially normal to each other is a preferred feature of the present invention.

Figure 3:
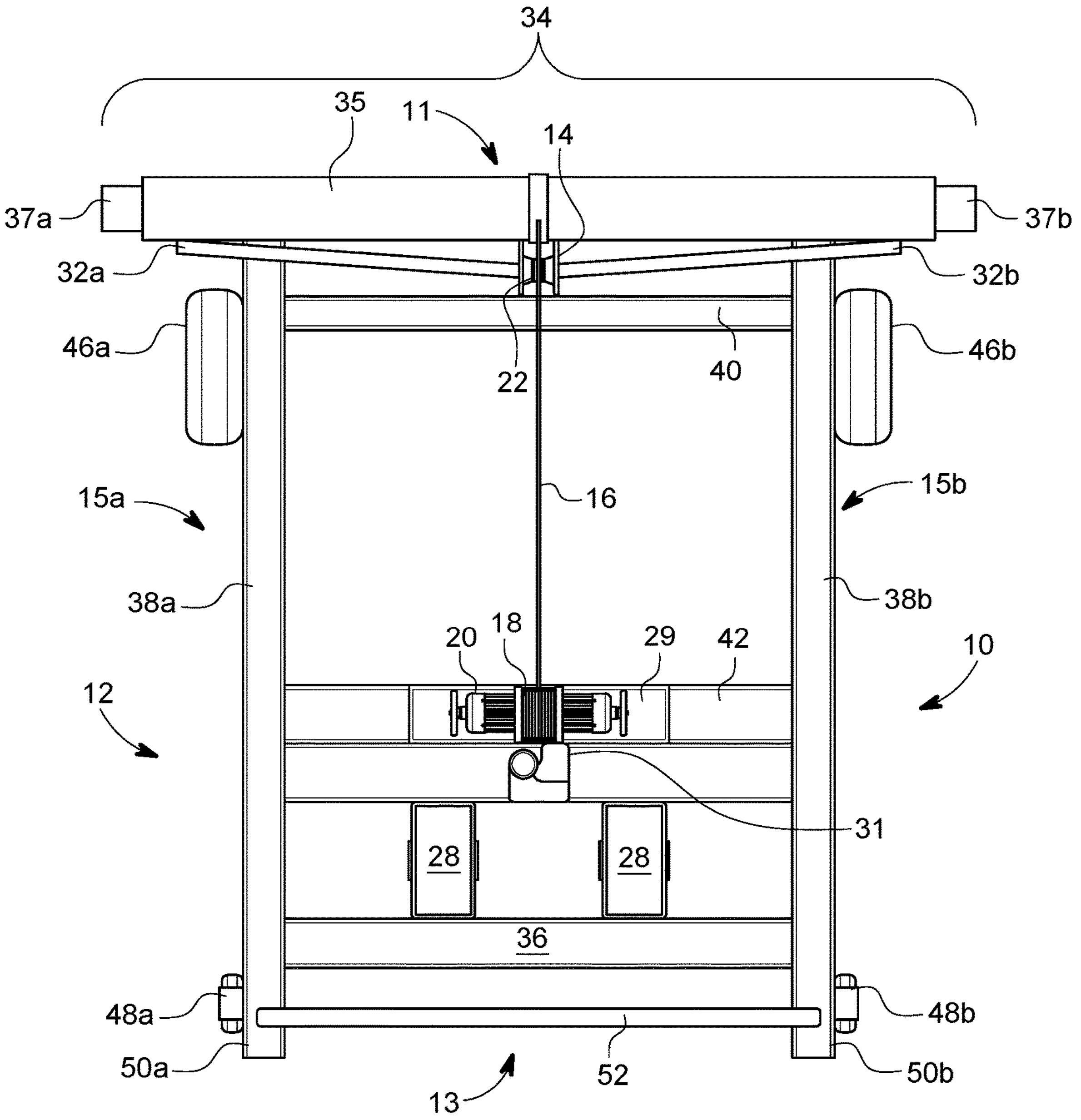
FIG. 3 illustrates a top view of an exemplary embodiment of a lifting apparatus according to the invention.
Figure 4:
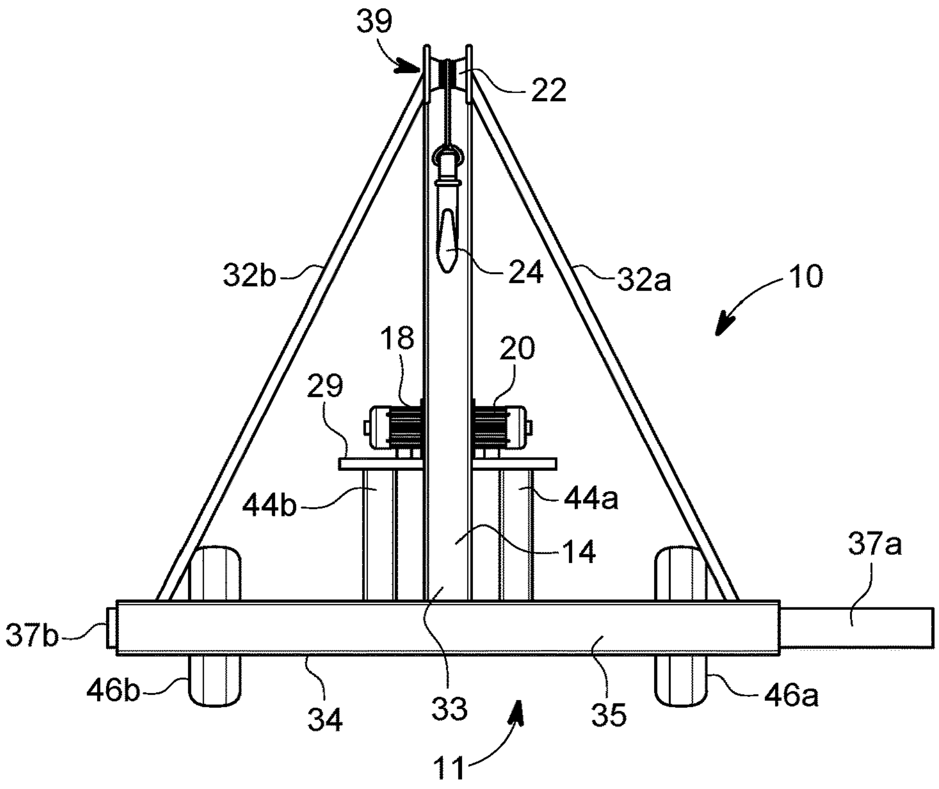
FIG. 4 illustrates a front view of an exemplary embodiment of a lifting apparatus according to the invention where one of the inner tubes is extended out but the other retracted in the front bar.

Specifically referring to FIGS. 1 and 2, but also to the top view provided in FIG. 3, the base platform 12 of the apparatus 10 can be of any shape, e.g., a quadrilateral, rectangle, square, triangle, oval or circle. The base platform 12 can be a planar platform or a frame comprising connected tubes, bards, and beams as shown in these figures, and preferably defines a front side 11 and a rear side 13 that are connected by two lateral sides 15*a* and 15*b*. Preferably, the base platform 12 is constructed out of a sturdy and durable material, e.g., steel, wood, concrete or hard plastic. In an embodiment shown in these figures, the base platform 12 is largely in the shape of a quadrilateral or rectangle where a front bar 34 is provided opposite a rear bar 36. Connecting the front bar 34 and the rear bar 36 are two side bars 38*a* and 38*b* of equal length. Optional parallel bars 40 and 42 can also be built into the frame largely in parallel to the front bar 34 and the rear bar 36. Specifically, the optional front parallel bar 40 can help stabilize the mast 14. The bars in the base platform 12 can be welded together or bolted onto each other or otherwise connected. Over the rear parallel bar 42, the raised platform 29 where the winch 20 rests upon can be built over a vertical support, e.g., one or two vertical columns 44*a* and 44*b* that are optionally adjustable in height (FIG. 1).

At least one of the bars in the base platform 12 can also be adjustable in length, e.g., the front bar 34 can consist of telescoping tubes where one or more inner tubes slide in and out of an outer tube (see FIGS. 2-5). In one embodiment, the front bar 34 includes retractable inner tubes 37*a* and 37*b* respectively on each end of a four-feet long outer tube 35 (e.g., with square, 4-inch cross-section). When fully extended on both ends, the front bar 34 in a preferred embodiment is about 96 inches or 8 feet long with half the length being retractable, i.e., each of the inner tubes 37*a* and 37*b* is about 24 inches long. The side bars 38*a* and 38*b* are each about 5-6 feet long in a preferred embodiment.

The rear bar 36 is preferably a solid strut/beam or filled with one or more steel rods in order to weigh down the base platform 12 in particular the base's rear portion. This is particularly important once the front of the apparatus is loaded with a heavy cargo. To further counter the weight of the cargo, one or more counterweights (FIGS. 9A-9B) can be added to the rear of the base platform 12 including over the rear bar 36, depending on how heavy the cargo is, to prevent the apparatus 10 from toppling over.

Figure 5:
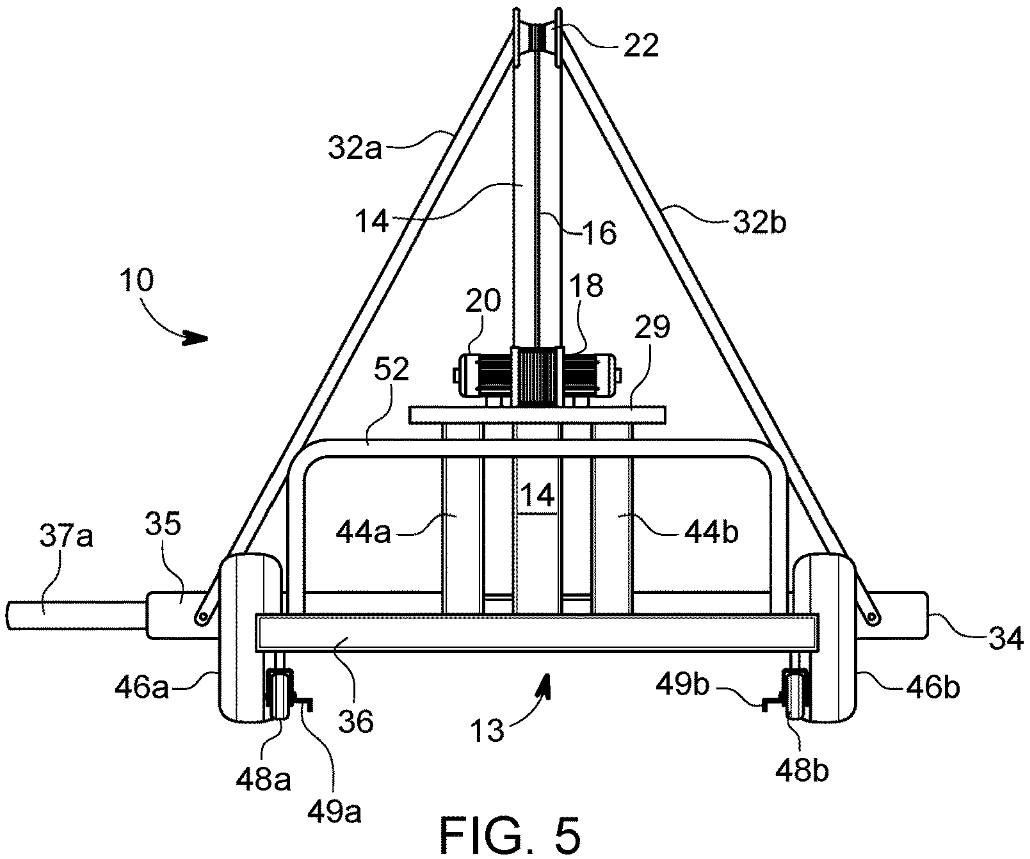
FIG. 5 illustrates a rear view of an exemplary embodiment of a lifting apparatus according to the invention where one of the inner tubes is extended out but the other retracted in the front bar.

At least two sets of wheels are fitted to the base platform 12 to facilitate moving the apparatus 10. In the front of the base platform 12 are one or more pairs of front wheels, preferably a pair of wide tires 46*a* and 46*b* for broadly distributing the weight of the apparatus 10. They can be affixed through axles to the side bars 38*a* and 38*b*, e.g., right behind the front bar 34 (for better views, see FIGS. 1 and 3). The front wheels are preferably wide tires, e.g., each wider than 7, 8, 9, 10, 11, or 12 inches in cross-section. In the rear of the base platform 12, one or more pairs of rear wheels, preferably a pair of swivel wheels or casters 48*a* and 48*b*, are affixed to the base platform 12. The rear wheels 48*a* and 48*b* allow easy turning and are each further preferably equipped with a locking mechanism 49*a* and 49*b*, respectively, for locking the wheels once the apparatus 10 is in position (best viewed in FIGS. 5 and 9B). The rear wheels 48*a* and 48*b* can be each affixed, e.g., through bolts, to the rear bar 36 as shown in FIGS. 1 and 5, or, as illustrated in FIG. 2, to tail bars 50*a* and 50*b*, respectively. As the rear wheels 48*a* and 48*b* just need to be disposed towards the rear of the base platform 12, the tail bars 50*a* and 50*b* can be closer (or further apart) to each other than the side bars 38*a* and 38*b* (FIG. 2), or align with side bars 38*a* and 38*b* (FIG. 3) such that they become extensions or parts of the side bars (FIG. 3). The rear wheels 48*a* and 48*b* can be affixed to a bar on its side (FIG. 3) or underneath it (FIG. 5).

An optional pull or push bar 52 is provided on the base platform 12 for ease of moving the apparatus 10 and for transporting any cargo. In preferred embodiments, the push bar 52 is a C-shaped structure having a horizontal bar supported by two vertical bars at both ends and is erected towards the rear of the apparatus 10, e.g., over or near the rear bar 36 (FIG. 5). In other embodiments, the push par 52 can have its two vertical supporting bars based on the two parallel bars 38*a* and 38*b* or the tail bars 50*a* and 50*b* of the base platform 12, respectively (FIG. 3).

Figure 6:
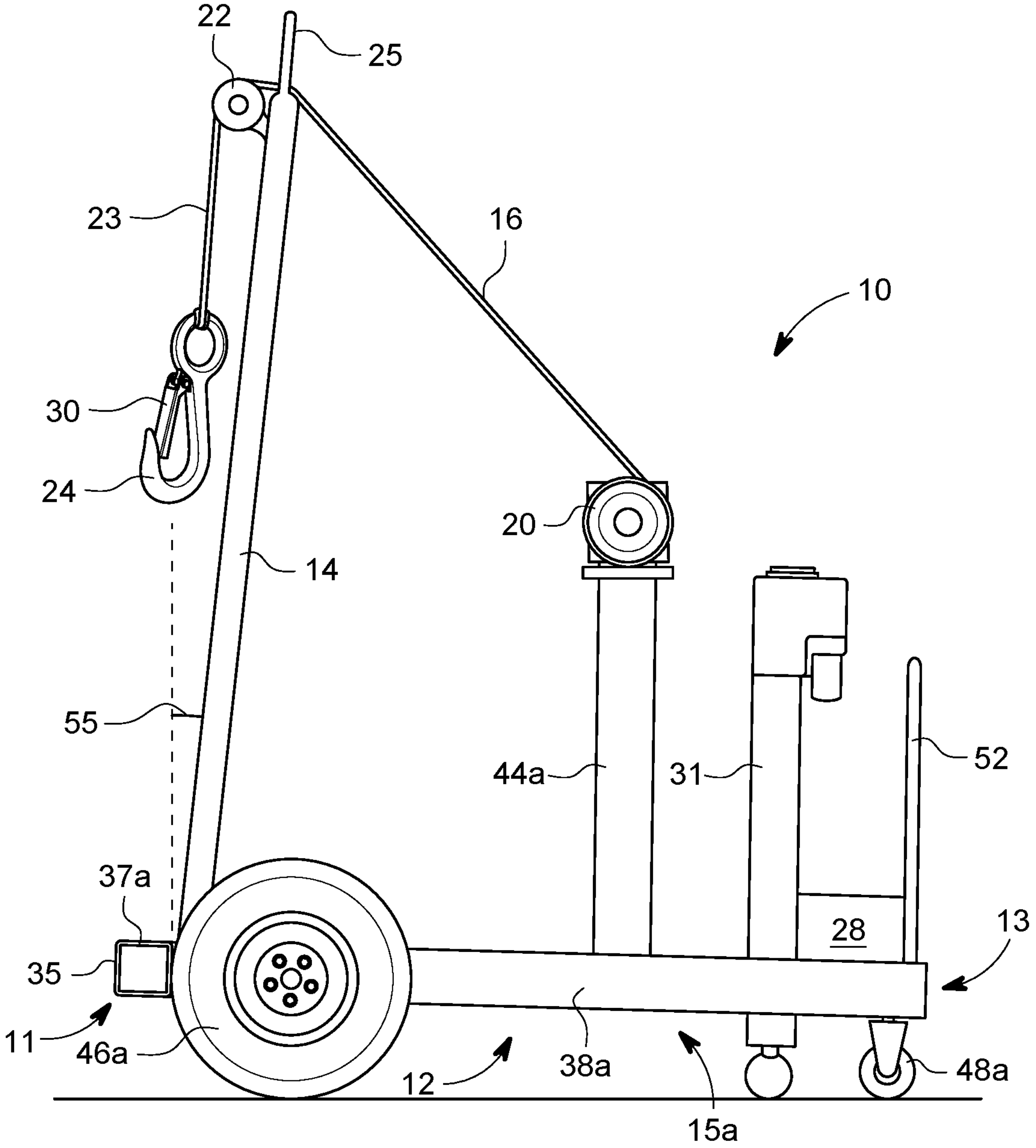
FIG. 6 illustrates a side view of an exemplary embodiment of a lifting apparatus according to the invention.

As shown in FIGS. 1 and 6, in a preferred embodiment, when both the front wheels (46*a* and 46*b*) and the rear wheels (48*a* and 48*b*) are resting on the ground, the base platform 12 is not horizontal due to the difference in sizes (i.e., diameters) between the front wheels and rear wheels (e.g., about 8 inches in difference). As a result, the apparatus 10 will tilt towards the rear at an angle 55 as measured between the mast 14 and a true vertical plane. The angle 55 can be between 0 and 45 degrees, preferably between about 5 and about 30 degrees. This tilt is beneficial for stability when the apparatus 10 is loaded with a heavy or bulky article. To adjust the level of tilting, however, an optional jack 31 is provided towards the rear to raise and afterwards lower the rear portion of the base platform 12. In an embodiment, the jack 31 is disposed between the rear parallel bar 42 and the rear bar 36, but could be provided elsewhere on the base platform 12. In a preferred embodiment, the jack 31 is electric and is powered through an electric connection to the battery pack 28.

According to principles of the present invention, the apparatus 10 relies on a heavy-duty cable 16 (or, a rope, wire rope, or tape) and related mechanisms for lifting the cargo. In a preferred embodiment, this is achieved through a cable actuation means. The cable 16 preferably is made of steel but can be of other materials such as known strong natural or polymeric fibers as long as it can withstand the expected weight/pull of the cargo. In a preferred embodiment, the cable 16 is actuated through an electric winch 20 that can wind it onto or unwind it off a drum 18 such that the cable 16 extends or withdraws through an optional cable guide 25 and/or a cable wheel 22 over the mast 14, thereby lowering or lifting a cargo 30 fastened to the cable distal end 23, e.g., through a hook 24 (FIG. 6). The drum 18 can be part of the winch 20 or separate from it depending on the model of winch being utilized. In an exemplary embodiment, the winch 20 is a 2-speed electric winch with a foot control on a 10-foot-long cord (not shown) and equipped with a cable 16 that is about 65 feet long. An unlimiting example of the winch is a 5.4 horsepower Badland® truck winch with a 9,000 pounds (about 4,000 kg) towing capacity.

The vertical mast 14 defines a top 39 and a bottom 33. The mast 14 is erected on the apparatus's base platform 12 proximate to the base platform's front side 11 (FIG. 4), preferably at an angle about 90 degrees, but other degrees are permissible and the connection between the mast 14 and the base platform 12 can be fixed or flexible. For example, for a fixed connection, the mast 14 can be welded or bolted to the top or a side of the front bar 36; for a flexible connection, the mast 14 can be connected to the top or a side of the front bar 36 through a pin, a pivot or a rachet mechanism. The mast 14 shown is a column elongated in the vertical direction, e.g., a hallow steel tube with a square cross-section that is about 4 inches wide, but the mast 14 can also include one or more horizontal-extending elements/members (e.g., similar to a cross) or the mast 14 itself can extend in the horizontal direction as well as the vertical direction (e.g., similar to a door). In a preferred embodiment, the mast 14 consists of telescopic tubes 14A and 14B that are about 8 feet tall, and is adjustable in height with the maximum height reaching, e.g., 16 feet (FIG. 2).

The mast 14 can serve a few functions. First, it supports the cable 16 and the cargo's weight transferred onto the cable. Second, it guides the cable 16. This may be further assisted with the cable guide 25, which is a pair of protrusions on top of the mast 14 that provides a channel for the cable 16. There may also be the cable wheel 22, which can be disposed around the top of the mast 14 including in the front (FIG. 6) or the rear area around the mast top. In a preferred embodiment, the cable wheel 22 serves as the cable guide and is disposed on top of the mast 14. Third, the mast 14 can provide some support for the cargo especially a bulky one during operation as the difference in wheel sizes provides a built-in tilt towards the rear at the angle 55 as discussed above in connection with FIG. 6. To that end, the mast 14 can be designed with some structure/mass in the horizontal dimension. One way to do this is to connect one or more elongated bars or tubes extending in the horizontal direction to an existing vertical mast 14 such that if the cargo starts to swing or lean rearward, these bars provide added support for the cargo. A simple example is a cross-shaped structure for the mast 14. Another way is to design the mast 14 itself to be bulkier, e.g., extending more in the horizontal direction and resemble more of a rectangle, a door frame, or a wall itself.

In operation, an operator lowers the cable distal end 23 by unwinding the cable 16 from the drum 18 through a control, e.g., a foot control, on the winch 20. The operator can also adjust, before, after or during this step, the height of the rear portion of the apparatus 10 by operating the electric jack 31. For example, the operator can tilt the mast 14 more towards the front by raising the rear portion to make it easier for the fastening and loading of the cargo. Once the cargo is securely fastened and loaded, the operator can use the jack 31 to lower the rear portion back down and operate the winch 20 to wind up the cable 16 in order to lift the cargo off the ground.

Figure 7:
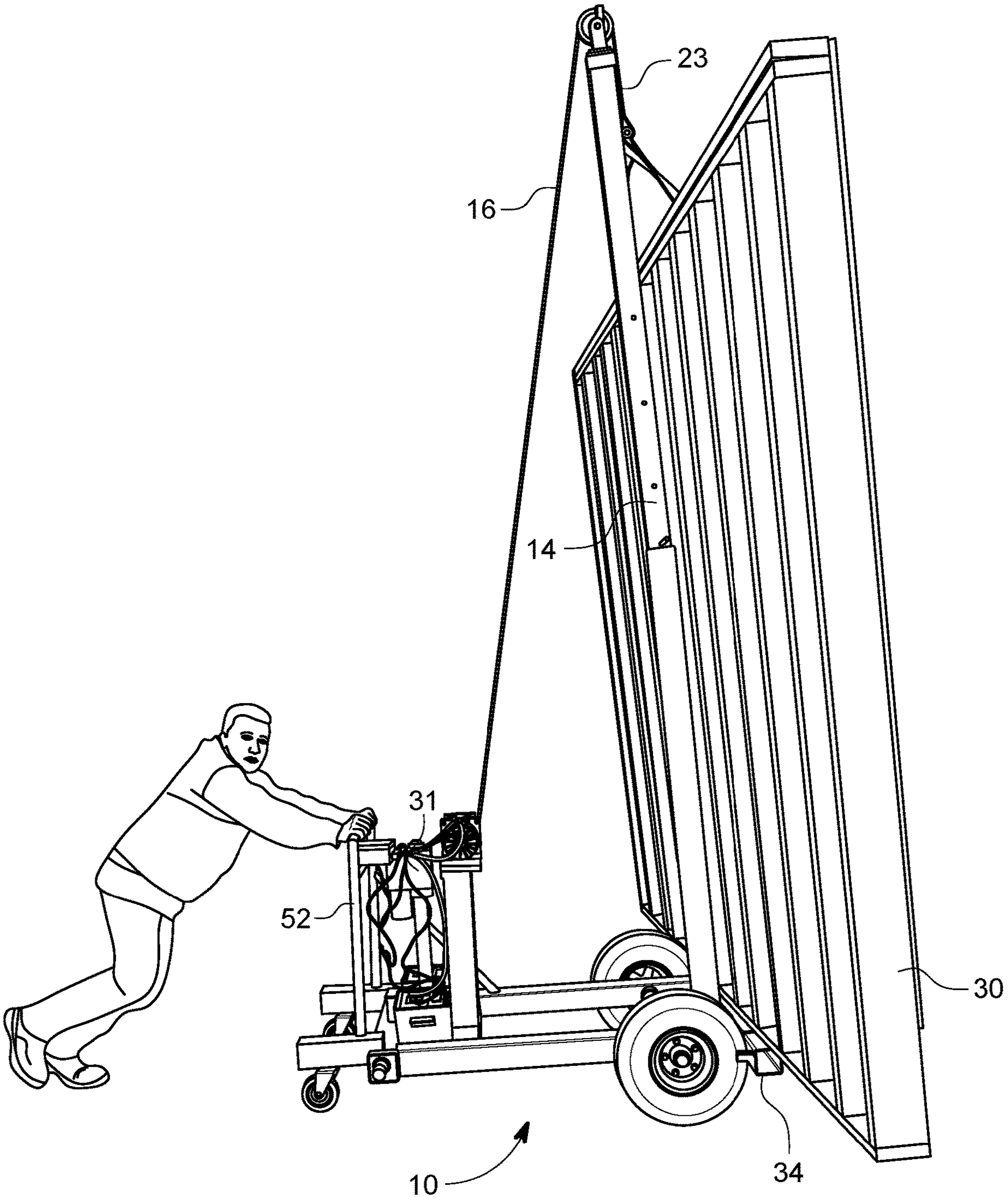
FIG. 7 shows how an operator uses an exemplary embodiment of a lifting apparatus according to the invention to transport a prefabricated wall.

Once the intended cargo 30 is loaded onto the cable distal end 23 through the fastening means, the operator can push or pull the push bar 52 to move the loaded apparatus 10 to a destination for the cargo (FIG. 7). As illustrated in FIGS. 7 and 9A, the cargo 30 can be a prefabricated wall weighing about 1,600 pounds (725 kg) and measuring more than 14 feet wide at its longest dimension. Once secured to the cable distal end 23, the wall can rest over the front bar 34 and lean against the mast 14. The title towards the rear provides additional stability during the transport.

Figure 8:
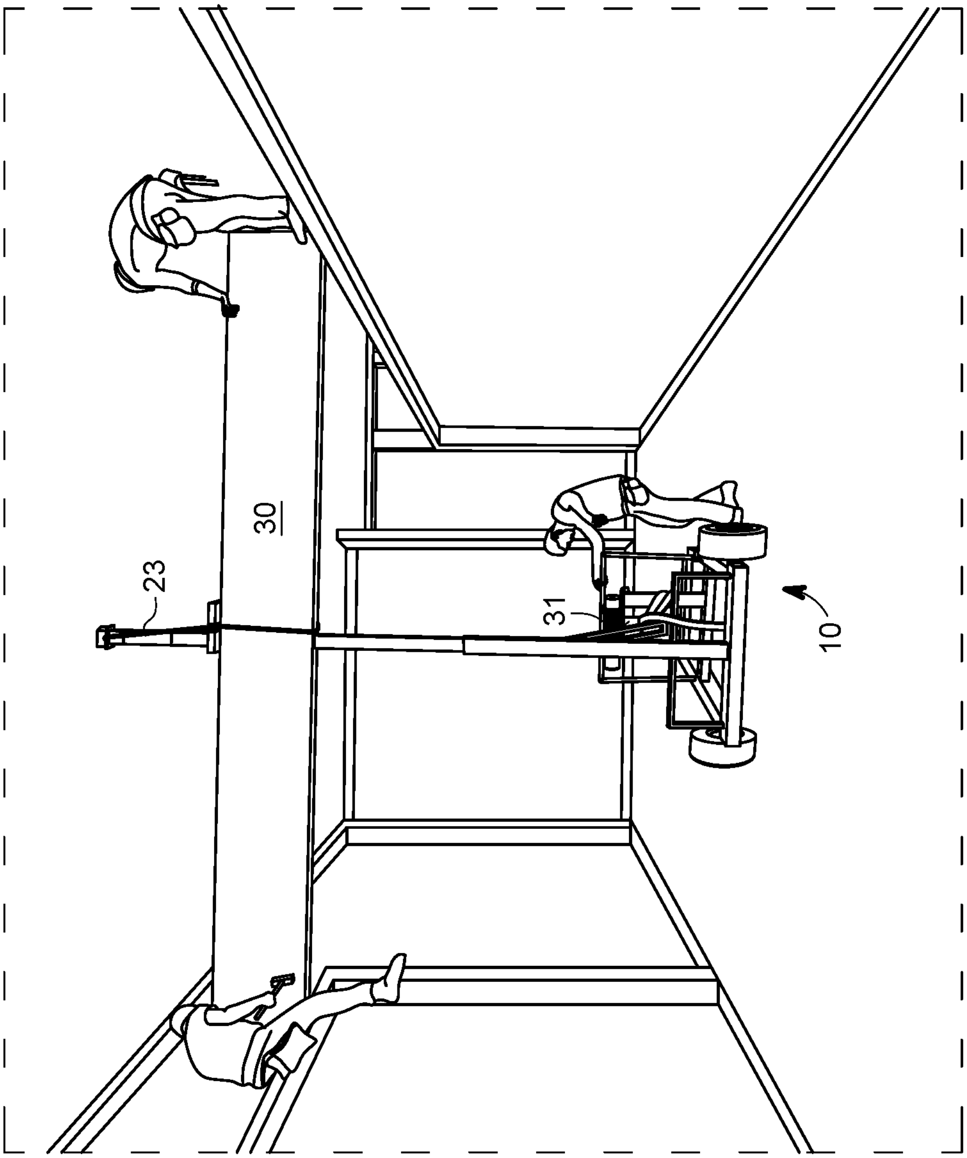
FIG. 8 shows how an operator, with assistance from other crew members, uses an exemplary embodiment of a lifting apparatus according to the invention to lift and position a large beam structure into place at a construction site.

After arriving at the destination, the operator engages stops including wheel locking mechanism 49*a* and 49*b* to immobilize the apparatus 10 (FIG. 9B). Then the operator can raise or lower the cable distal end 23 by winding or unwinding the cable 16 onto or off the drum 18 through a control on the winch 20. The operator can also adjust, before, after or during this step, the height of the rear portion of the apparatus 10 to better position the cargo by actuating the electric jack 31. Once the operator has maneuvered the cargo, e.g., a large beam, into the desired position, the operator can actuate one or both of the winch 20 and the jack 31 to relax the cable distal end 23 for unfastening the cargo (FIG. 8).

While the present invention has been particularly shown and described with reference to the structure and methods disclosed herein and as illustrated in the drawings, it is not confined to the details set forth and this invention is intended to cover any modifications and changes as may come within the scope and spirit of the following claims. All publications and patent literature described herein are incorporated by reference in entirety to the extent permitted by applicable laws and regulations.

What is claimed is:

1. An apparatus for lifting and transporting a bulky cargo, said apparatus comprising:

a. a base platform defining a front side and a rear side that are connected by two lateral sides, said base platform fitted with a pair of front wheels proximate to said front side and a pair of rear wheels proximate to said rear side, wherein said front wheels are larger than said rear wheels such that when both front and rear wheels are resting on the ground, a vertical mast erected on said base platform tilts towards said rear side at a tilt angle;

b. said mast having a top and a bottom and extends at least six feet in height with a cable guide disposed proximate to said mast top, a raised platform supported by one or more vertical supports erected on said base platform, said raised platform in turn supports a winch comprising a drum onto which a cable is wound, wherein said cable further traverses over said top or proximate to said top and is guided in between said cable guide such that a distal end of said cable is available over said front side of said base platform for fastening a cargo thereto through a fastening means;

c. one or more structural stabilizers for preventing said vertical mast from movement relative to said base platform;

d. a jack for raising and lowering a portion of said base platform such that said tilt angle reaches between 0 and 45 degrees; and e. a battery pack and a counterweight disposed proximate to said rear side of said base platform to prevent said cargo up to at least 1,600 pounds in weight from toppling during tilting, said battery pack electrically connected to said winch.

2. The apparatus of claim 1 wherein at least two of said structural stabilizers are connected to said mast, respectively, in two planes that are substantially normal to each other.

3. The apparatus of claim 1 wherein said front wheels are larger in diameter than said rear wheels by about 8 inches or more.

4. The apparatus of claim 1 wherein said tilt angle is between 5 and 30 degrees.

5. The apparatus of claim 1 wherein said jack is electric or hydraulic.

6. The apparatus of claim 1 wherein said jack is manual.

7. The apparatus of claim 1 wherein said rear side of said base platform comprises a solid beam or is filled with steel rods.

8. The apparatus of claim 1, further comprising a push bar installed over said base platform for moving said apparatus.

9. The apparatus of claim 1, wherein said vertical mast is further connected to a horizontal member for providing cargo support.

10. The apparatus of claim 1, wherein said vertical mast is adjustable in height.

11. The apparatus of claim 1, wherein said front side of said base platform comprises telescoping tubes that extend to about 8 feet in length.

12. A method of lifting and transporting a bulky cargo using the apparatus of claim 1.

13. The method of claim 12 wherein said bulky cargo measures more than 5 feet at least in one direction.

14. The method of claim 12 wherein said bulky cargo measures more than about 14 feet at least in one direction.

15. The method of claim 12 wherein said bulky cargo weighs more than 3,000 pounds.

* * * * *